(12) United States Patent
Jayachandran et al.

(10) Patent No.: US 7,761,829 B1
(45) Date of Patent: Jul. 20, 2010

(54) GRAPHICAL SPECIFICATION OF RELATIVE PLACEMENT OF CIRCUIT CELLS FOR REPETITIVE CIRCUIT STRUCTURES

(75) Inventors: Jagadeesan Jayachandran, Tamil Nadu (IN); Steve Song Lee, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 440 days.

(21) Appl. No.: 11/518,921

(22) Filed: Sep. 12, 2006

(51) Int. Cl.
*G06F 17/50* (2006.01)

(52) U.S. Cl. .................... 716/9; 716/1; 716/11; 716/18

(58) Field of Classification Search .................... 716/1, 716/9, 11, 18
See application file for complete search history.

(56) References Cited

U.S. PATENT DOCUMENTS 5,696,693 A * 12/1997 Aubel et al. .................... 716/8

* cited by examiner

*Primary Examiner*—Thuan Do
(74) *Attorney, Agent, or Firm*—Rosenberg, Klein & Lee (57) ABSTRACT

A graphical specification entry interface allows a circuit designer to define relative placement of repeating circuit component cells. The repetitive placement specifications are used to generate a repetitively structured circuit cell which may be subsequently installed into a physical circuit medium. The system simplifies user interaction in generating repetitive circuit structures such as semiconductor memory and, while affording heretofore unavailable topological diversity of such circuits.

18 Claims, 8 Drawing Sheets

FIG. 1

PRIOR ART

GRAPHICAL SPECIFICATION OF RELATIVE PLACEMENT OF CIRCUIT CELLS FOR REPETITIVE CIRCUIT STRUCTURES

BACKGROUND OF THE INVENTION

1. Field of the Invention

The invention described herein is related to specifying placement in a physical circuit medium of circuit components to generate a memory system or other repetitive circuit structure in the medium. Specifically, the invention allows graphical specification entry of circuit component placement through a graphical user interface to specify user-arranged circuit topologies in an integrated circuit design.

2. Description of the Prior Art

Memory generators are engineering design tools that allow circuit designers to configure a memory circuit for incorporation into an integrated circuit (IC) design. Modern semiconductor memories consist of highly-repetitive circuit structures consisting of millions of similar bit storage cells arranged in an array. Memory generators allow circuit designers to bypass much of the repetitive cell placement work by accepting parameters indicating the size of the array needed and automatically generating the underlying array structure accordingly.

Figure 1:
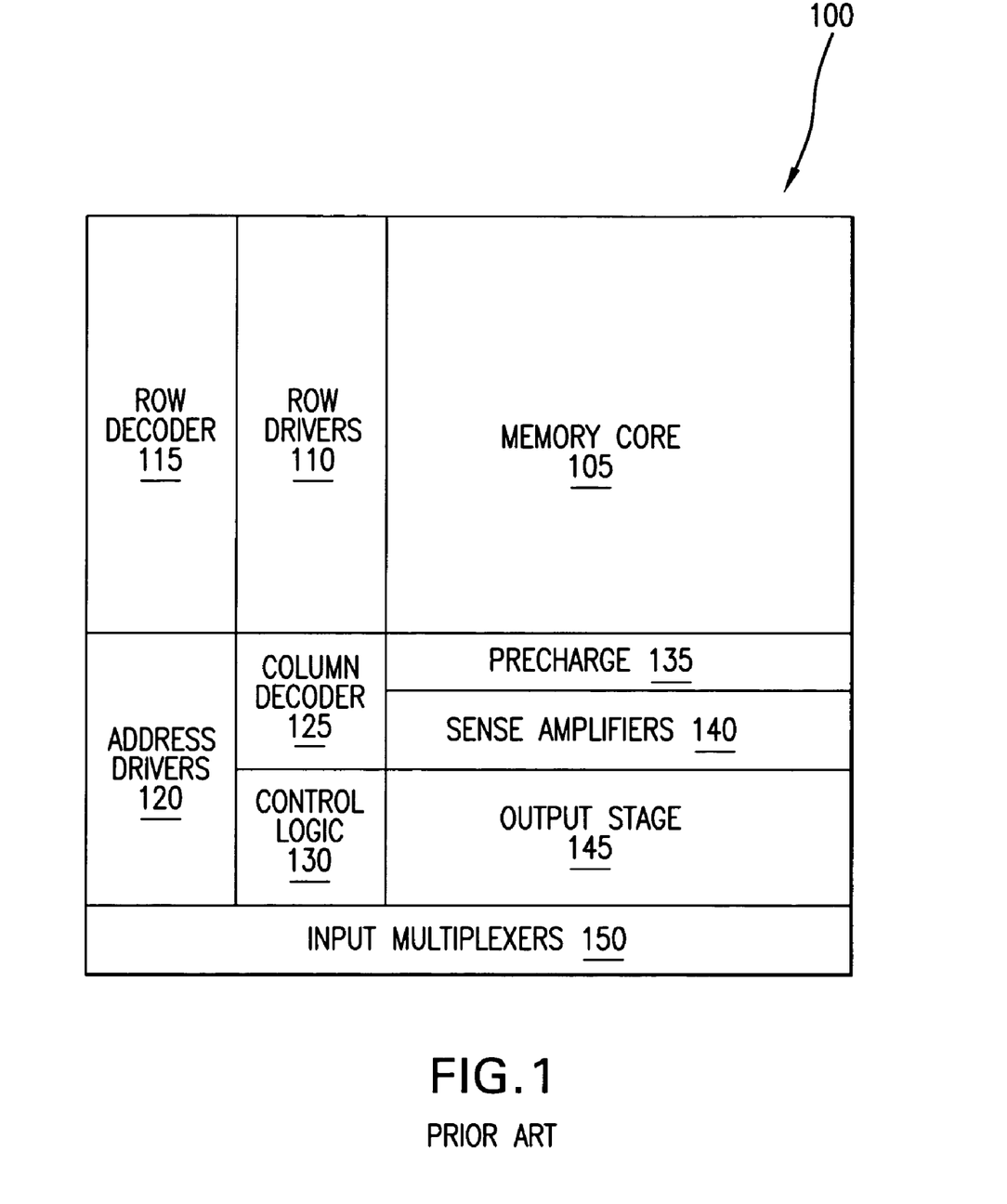
FIG. 1 is a block diagram of a typical memory system architecture.

Generally, memory generators work as a module in an engineering design automation (EDA) system for designing an application specific memory circuit, such as that depicted in FIG. 1. As is shown in the Figure, the memory block 100 includes a memory core 105 and auxiliary circuits that include row drivers 110, a row decoder circuit 115, address drivers 120, a column decoder circuit 125, control logic 130, a precharge circuit 135, sense amplifiers 140, an output stage 145 and input multiplexers 150. The functionality of the memory core and the auxiliary circuitry is well known and will not be described in detail herein. A traditional memory generator allows the designer to specify certain aspects of the memory core and many then incorporate the auxiliary memory circuits according the user-designated core size.

Memory generators presently in use are generally vendor-specific, where the vendor specifies what memory design parameters may be controlled by the end-user. The changeable parameters are usually restricted to memory width (the number of bits in a word) and depth (the number of words in the memory block). While a particular vendor may allow the user to choose a type of memory configuration, e.g., single and dual-port static random access memory (SRAM), single and dual-port register files, programmable diffusion read-only memory (ROM), these topologies are fixed by the vendor.

Memory generation can be achieved through rigorous placement procedures defined by a programming language such as SKILL. Such methods are inherently tedious in that one must first have at least a working knowledge of the programming language and then must rely on mental imagery of the placement in that such placement programming is inherently non-graphical. Further, modifications to a memory design must be made through a skilled programmer who may be other than the designer requiring the change. Additionally, as with any programmed logic, the design cycle must anticipate often lengthy debugging cycles, even when minor changes are introduced to the design.

Given the shortcomings of the present technology, the need is apparent for a circuit generator that automates repetitive component placement in accordance with a simplified specification entry of a user-designated circuit topology. Such circuit generators may be used to generate memory circuits as well as other repetitive circuit structures.

SUMMARY OF THE INVENTION

In one aspect of the invention, a method is provided for generating a circuit cell containing repeating constituent circuit cells. Placement of a circuit cell is specified through manipulation of indicia in a graphical user interface. A repetitive placement operation is specified for placing in the physical circuit medium additional circuit cells relative to the placement of the previously specified placement of the circuit cell to form a graphical circuit cell array specification. A circuit array cell is generated from the graphical circuit cell array specification.

In another aspect of the invention, a method is provided for generating a circuit cell containing repeating constituent circuit cells that specifies through manipulation of indicia in a graphical user interface a placement in a physical circuit medium of a circuit cell. A repetitive placement operation is specified through manipulation of the graphical indicia for placing circuit cells relative to the placement of the previously specified placement of the circuit cell to form a graphical circuit cell array specification. A repetitive placement operation is specified for placing in the physical circuit medium a block circuit cell relative to the placement of another block circuit cell through manipulation of indicia in the graphical user interface to form a graphical aggregate circuit cell specification, where the block circuit cell includes a circuit array cell generated from the circuit cell array specification. An aggregate circuit cell is generated from the graphical aggregate circuit cell specification.

In yet another aspect of the invention, a repetitive cell circuit generator includes a graphical specification entry interface executing on a data processing system and receiving from a user through manipulation of graphical indicia thereon repeated relative placement specifications of individual instances of a circuit component cell of a circuit to form a graphical circuit cell specification. A circuit cell generator is provided to generate a circuit cell in accordance with the graphical circuit cell specification.

DETAILED DESCRIPTION OF PREFERRED EMBODIMENTS

Certain beneficial features of the present invention are best understood by first defining certain terms used in its description. As used herein, the term "circuit cell" or simply "cell" is a circuit component or collection of circuit components installed into a physical circuit medium. A "physical circuit medium" refers to the medium receiving the physical structures of circuit cells forming the applicable circuit. For example, a silicon substrate of an integrated circuit is a physical circuit medium and there are, of course, many others. A "circuit cell specification" is a definition of the structure of the cell in the physical circuit medium. A circuit cell specification specifies the physical attributes of the circuit cell it defines. A "circuit array cell" is a circuit cell defined by a corresponding circuit cell array specification that is a composite structure of previously defined cells. A "block circuit cell" is a circuit cell defined by a corresponding block circuit cell specification that is a composite structure of previously defined cell arrays. An "aggregate circuit cell" is a circuit cell defined by a corresponding aggregate circuit cell specification that is a composite structure of at least one block cell and another circuit cell. These definitions are provided to delineate the members of hierarchically repeating circuit structures to be described below and are not meant to limit the scope of the invention to circuit designs having similar terminology.

As used herein, a "parameterized cell" is a circuit cell which can be differentiated across multiple instances of that cell. Such parameterized cells are known in the art and allow various attributes to be altered from one instance of a cell to another.

A particularly illustrative embodiment of the present invention is that of a memory generator, which is described below. As such, the term "auxiliary memory circuit cell" is a circuit cell that, when combined with a suitably specified repetitive circuit cell, such as a memory core block cell, forms a "memory storage block cell". A memory storage block cell contains the circuitry necessary to implement an operative memory circuit.

A "computing platform" as used herein is to be understood as a computer hardware system having an instruction set architecture (ISA) and an operating system executing under the ISA. Under this general description, a "platform independent specification" is a specification that may be ported to any computing platform regardless of the ISA and operating system.

It is to be understood that while a memory generator embodiment is described below, the invention is not intended to be limited thereto. The present invention is practicable in a wide variety of applications where repetitive circuit structures are to be generated in accordance with a user-specified topology.

Figure 2:
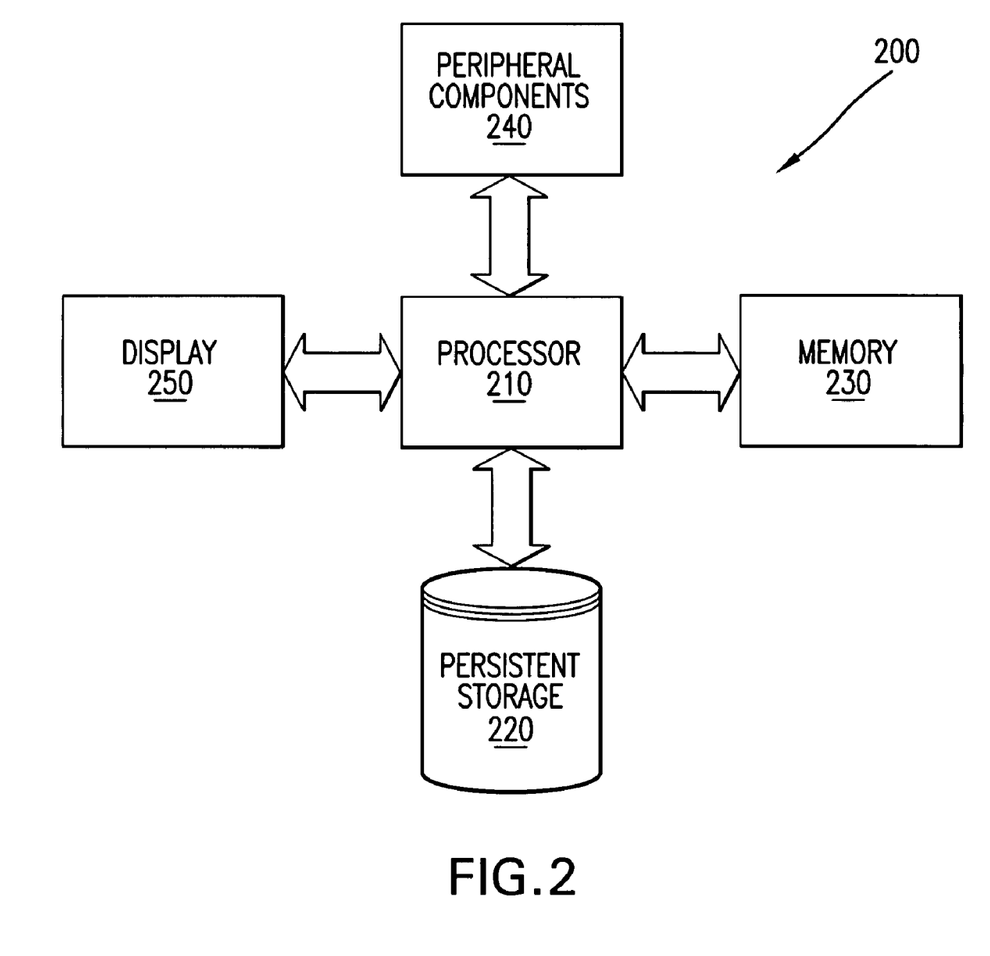
FIG. 2 is a block schematic diagram of an exemplary computing system architecture suitable for carrying out the present invention.

Embodiments of the present invention may be implemented on a suitable computing platform, such as that illustrated in FIG. 2. As is shown in the Figure, a computing platform 200 generally includes a processor unit 210 executing programmed processor instructions to implement an operating system and one or more computer applications running under control of the operating system. The processor 210 is coupled to a volatile memory unit 230 for volatile storage of program code and data and a persistent storage unit 220 for persistently storing both program code and data across power on/off cycles. The processor 210 is generally further coupled through an appropriate bus to one or more peripheral components 240 as well as being coupled to a display unit 250. The processor may execute code that implements a graphical user interface providing graphical output on display 250 and receiving user input via one or more peripheral components 240. Such graphical user interfaces are well known in the art, and the functional details will not be elaborated herein.

FIG. 2 illustrates a functional block schematic of an exemplary computer system on which the present invention may be implemented, however, it is to be understood that many variations exist. For example, whereas the computing platform of FIG. 2 is illustrated using singular discrete components, a suitable computing platform may include distributed components including multiple processors distributed across nodes of a network, as well as a singular processor coupled to multiple storage systems.

The present invention may be implemented on a suitable computing platform as sequences of processing instructions in a manner appropriate to the ISA and operating system of the computing platform. For purposes of explanation, the present invention will be illustrated by way of interoperating software components, such as those illustrated in FIG. 3. As is shown in the Figure, a memory generator 305 of the present invention is interoperable with a suitable engineering design automation (EDA) system 360. As will become apparent to the skilled artisan upon contemplation of this disclosure, it is considered to be a beneficial feature of the present invention that the memory generator 305 is independent of the EDA system 360. That is to say that the memory generator 305 may be external to the EDA system 360 and may be operating independently thereof. In such embodiments, the circuit cell generated by the memory generator is stored in a component library 350, where it is accessible by the EDA system 360. Exemplary mechanisms for implementing this functionality are fully described below.

Figure 3:
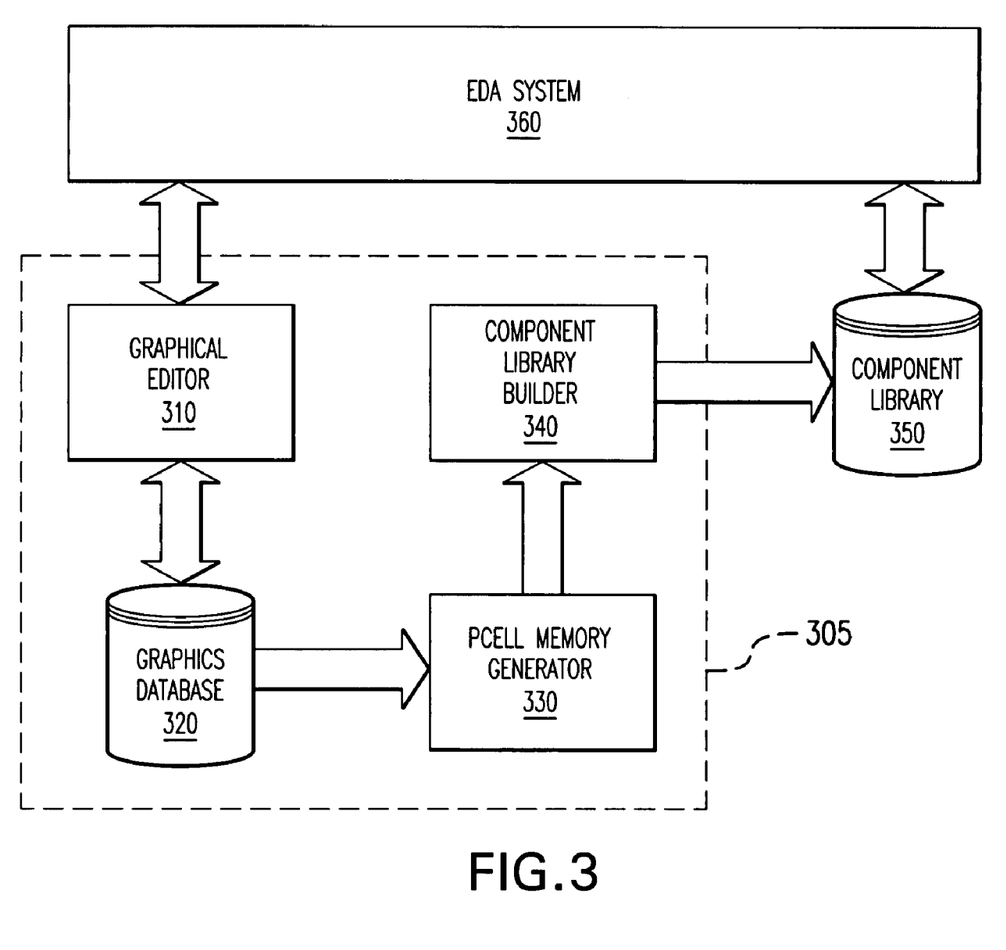
FIG. 3 is a block schematic diagram of exemplary functional components suitable for carrying out the present invention.
Figure 4:
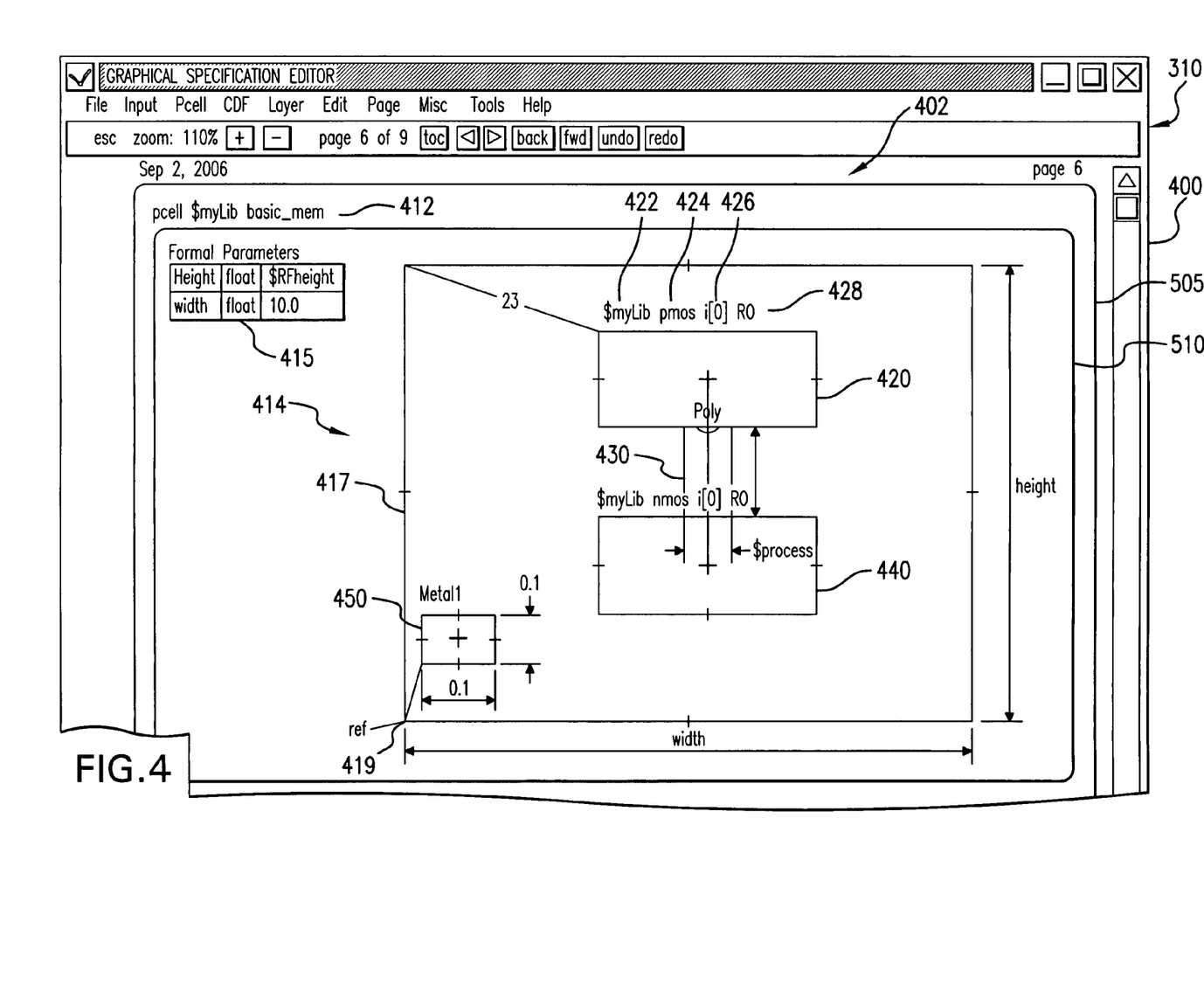
FIG. 4 is a diagram of an exemplary graphical specification entry interface having memory bit cell specifications entered thereon.

In the exemplary embodiment of FIG. 3, memory generator 305 includes a graphical editor 310 for graphically specifying placement of memory components in a physical circuit medium to form a user-selected memory topology. The graphical editor 310 may be implemented under a graphical user interface executing on the computing platform 200. An exemplary graphic editor 310 is illustrated in FIG. 4 as graphical specification editor 310. As is shown in the Figure, the graphical specification editor 310 is, in certain embodiments, a windowed interface 400 to an application, where such interface is well known in the art. The graphical specification editor 310 allows a user to modify by way of manipulating indicia on the graphical user interface a graphical specification 402. The graphical specification 402 defines the placement of the circuit cells forming the memory system. It is considered to be a beneficial feature of the invention that the graphical specification 402 allows the user to graphically specify the aspects of the memory system being generated at multiple levels of abstraction. For example, the component illustrated in FIG. 4 is a basic memory storage cell for storing a single bit of information. Such basic storage cells may be coupled to other such basic storage cells placed in the physical medium to form, say, a memory array cell. The memory array cell may then in turn be placed with auxiliary memory circuit cells in a user-specified topological configuration to form an overall memory circuit in accordance with the user's design specifications. The repeating circuit cells within repeating circuit cells form a hierarchy of repetitive circuit structure, which is graphically represented through various levels of abstraction in the graphical specification 402, as will become apparent in the paragraphs that follow.

To accommodate various levels of abstraction in graphical specification 402, multiple specification pages may be instantiated. For example, page 6 of the specification 402 is illustrated in FIG. 4 at 405. Page 6, as shown in the Figure, is dedicated to specifying characteristics and parameters of a basic memory storage cell. In certain embodiments of the present invention, the specification of circuit cells of a particular memory system are created, generated, stored and retrieved as parameterized cells. For example, one instance of a memory cell may be rotated with respect to a neighboring cell by simple alteration of its parameters. Further, when one parameterized cell is contained within another parameterized cell, parameters are propagated through the hierarchy of parameterized cells as appropriate. Such use of parameterized cells is well known in the art and will not be described further herein. However, it is to be understood that the present invention may be used with other definition structures other than parameterized cells.

As is shown in FIG. 4, the page at 405 of graphical specification 402 contains the specification 410 of a parameterized cell "basic_mem", as indicated by its title 412. The basic_mem parameterized cell may be stored in a component library 350 in a volume indicated by an environment variable "$myLib". Thus, when each page of the graphical specification 402 defines a separate circuit cell of the overall memory structure defined thereby, the specifications for each cell may be separately stored and retrieved from the component library 350.

The parameterized cell specification 410 includes a component specification 414 and a formal parameter table 415. The formal parameter table 415 initializes the parameter definitions for the basic_mem parameterized cell.

The component specification 414 includes two previously defined parameterized cells, a PMOS transistor cell 420 and an NMOS transistor cell 440. The two transistor cells are joined by a polysilicon channel 430. The PMOS transistor structure 420 and NMOS transistor structure 440 are instances of corresponding parameterized cells and, as such, may be reconfigured for each instance. The instance of PMOS transistor structure 420, for example, is instantiated from the parameterized cell located in the component library volume held in the environment variable $myLib, as shown at 422. The parameterized cell name is "pmos" as shown at 424. Each parameterized cell has an instance identifier, shown at 426, and each instance may have its own rotation, indicated at 428. In the example shown, the rotation designator "R0" specifies zero rotation with respect to a predefined reference mark. Such a reference mark for the parameterized cell 410 is shown in FIG. 4 at 419.

The bit storage cell defined by components 420, 430 and 440 are situated in a region defined by a boundary 417. When another circuit cell is set adjacent to the parameterized cell 410, it is set to the boundary 417. The boundary size is established, in this case, by the formal parameters set in the formal parameter table 415. When new instances of the parameterized cell are created that change the size of the boundary, the transistor structure held within is sized as well.

The parameterized cell 410 includes a metallized region 450 for providing an electrical connection to the storage cell. It should be noted also that the graphical specification 402 may contain specifications to physical characteristics of the cell structure, such as how such structures are to be built in the physical circuit medium. Thus, when cells are placed in accordance with the graphical specification 402, the appropriate structure is built in the physical circuit medium for achieving the proper electrical characteristics of the circuit.

Figure 5:
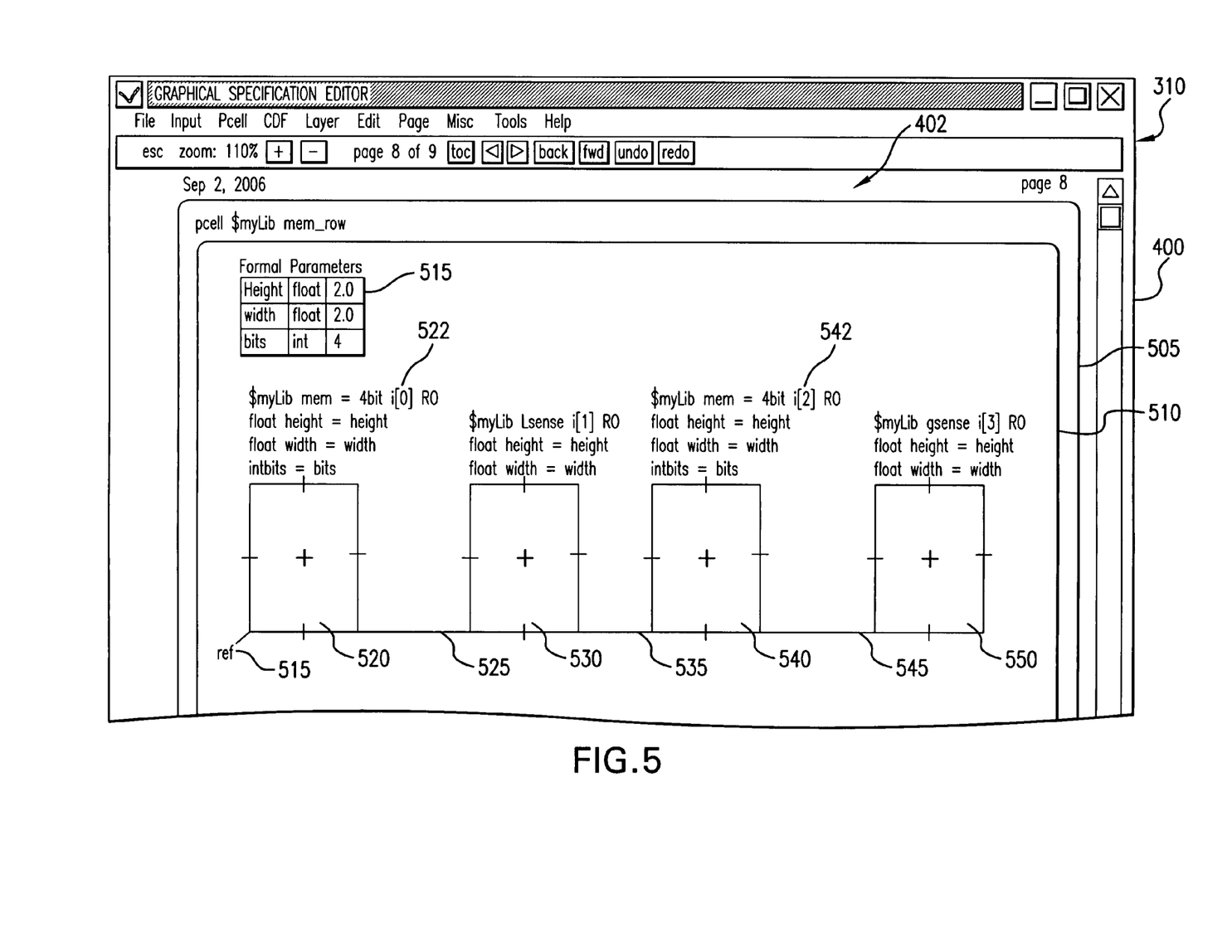
FIG. 5 is a diagram of the exemplary graphical specification entry interface having a memory row block specifications entered thereon.

Referring now to FIG. 5, there is shown another page 505 of graphical specification 402. In FIG. 5, a parameterized cell specification 510 is established for the parameterized cell "mem_row", which defines a memory row topology in an exemplary memory storage block configuration. The memory row consists of four component cells, a four bit memory array cell 520, a local sense amplifier block cell 530, another four bit memory array cell 540 and a global sense amplifier block cell 550. The memory cell arrays 520 and 540 are repetitive circuit cell structures formed from individual bit storage cells 410. It is to be noted that the four bit memory array cells 520 and 540 are separate instances of the same parameterized cell and are assigned individual instance identifiers 522 and 542, respectively.

Each of the circuit cells 520, 530, 540 and 550 are joined together by a relative placement specification 525, 535 and 545. Thus, a user need only manipulate indicia in the graphical specification editor 310 to indicate relative placement and alignment of constituent component cells. Further, it is to be noted that while space is shown between cells 520, 530, 540 and 550 in the graphical specification 402, the physical placement in the circuit medium will be such that the cell boundaries are adjacent one to another. To establish physical space between circuit cells, the user would merely enter a spacing cell into the specification 420 and such spacing is then introduced into the physical circuit. The placement specifications 525, 535 and 545 specify the relative placement of cells in the graphical specification 402, but with variable spacing for purposes of legibility.

The parameterized cell mem_row, which is an aggregate circuit cell as defined above, receives its own formal parameter table 515 and a reference 519. Thus, when the parameterized cell mem_row is instantiated, it can be placed and oriented in space relative to its reference point 519, as well as to be instantiated with parameters appropriate to the application.

Figure 6:
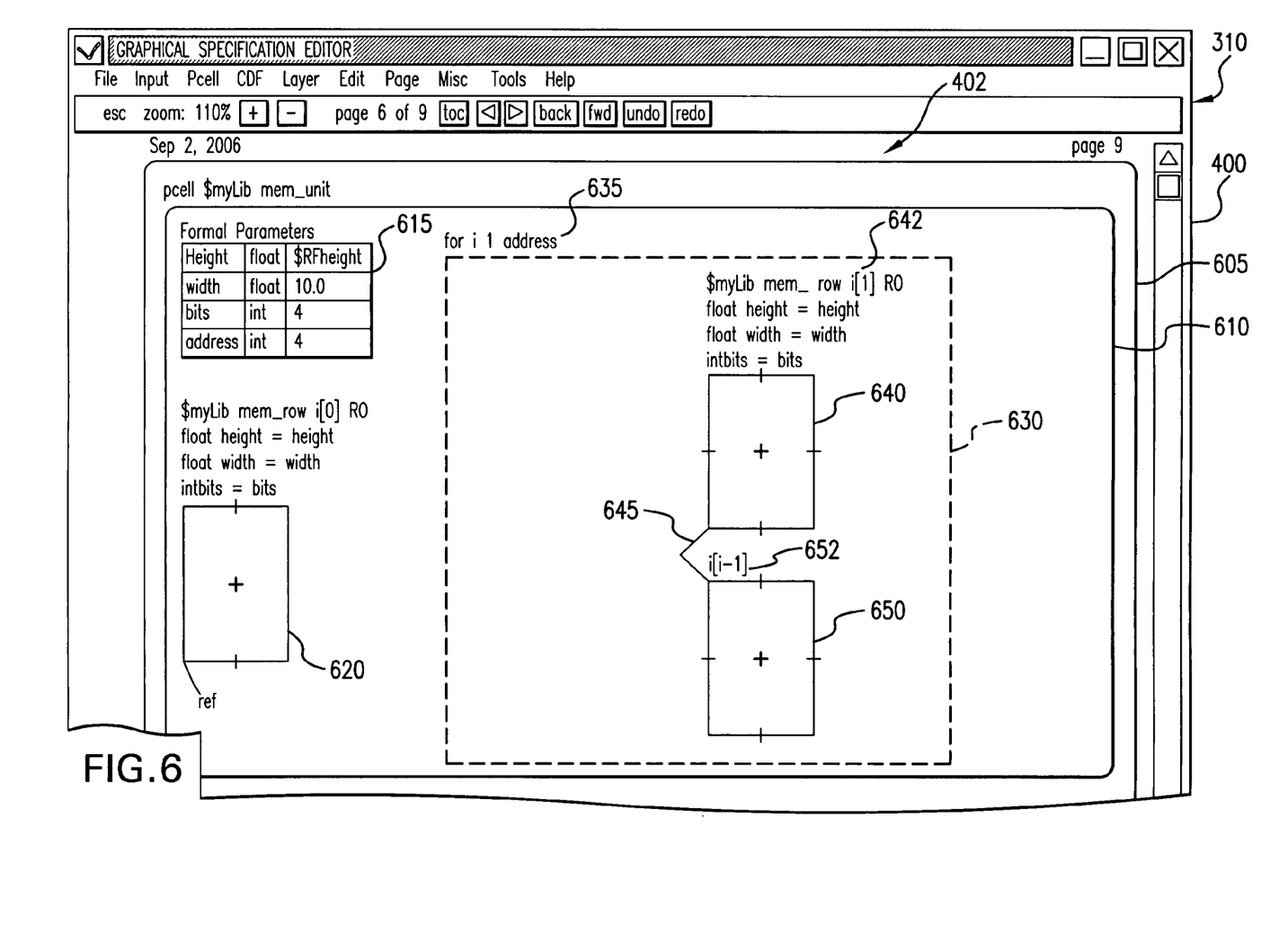
FIG. 6 is a diagram of the exemplary graphical specification entry interface having a memory storage system specifications entered thereon.

FIG. 6 depicts yet another page 605 of the graphical memory specification 402. On the page 605 illustrated, a parameterized cell "mem_unit" defines a memory storage block cell, which, in this example, is the final structure for the exemplary memory storage block. The parameterized cell specification 610 includes, as in previous specifications, a formal parameter table 615 for specifying the parameters of the cell. The mem_unit cell contains a first instance 620 of the mem_row parameterized cell defined in FIG. 5. A control block 630 is then established to place repeating memory rows in a column-wise pattern. This is done simply by manipulating indicia in the graphical user interface 400 to establish a control block 630 such as by a drag operation of a mouse. The user then enters the control block information, which in the example of FIG. 6 is a well known for-loop. A control statement 635 is attached to the control block 630 for establishing control of the operations contained within the control block 630.

Within the control block 630, it is shown that an instance 640, indexed by the control variable "i" established in statement 635, is to be placed adjacent a previously placed memory row 650. The control variable "i" indexes the instance number 642, 652 to specify that instances are to be placed relatively adjacent one to another. The column-wise placement is specified by the placement specification 645.

In the example shown in FIG. 6, a memory storage block cell is built from four adjacently positioned memory row cells, which in turn are built from smaller memory array cells 520 and 540 and auxiliary circuit cells 530 and 550. It is believed to be a particularly beneficial feature of the invention that multiple repeating structures may be specified at multiple levels of abstraction through the graphical specification entry interface 310. Semiconductor memory systems are inherently repetitive at multiple granularity levels. The present invention allows a designer to control the repetition of cells in both number and topology and to place the appropriate auxiliary circuitry, such as sense amplification stages, decoder stages and precharge stages, in user selected locations to define a topology which is appropriate to the circuit being designed. Thus, a designer may specify a particular circuit footprint for the memory storage block cell that is compatible with the layout of a particular integrated circuit and graphically assemble the appropriate cells accordingly through the graphical specification entry interface 310.

Returning now to FIG. 3, there is shown that the graphical editor 310 is coupled to a graphics database 320 for retrieving and storing various shapes used in defining the graphical specification described above. The graphics database may also store the graphical specification itself. This may be achieved by correlating the graphical representations of the circuit cells with appropriate data structures maintained in memory on the computer platform 200. The data structures may then be incorporated into a file formatted in compliance with the operating system of the computing platform 200. Other suitable conversions of the graphically represented data may also be implemented without deviating from the spirit of the invention.

The stored specification may be retrieved from database 320 by a parameterized cell based memory generator 330. The memory generator 330 is operated to extract the information from the specification file and to form therefrom a complete parameterized cell for the memory storage block defined therein. In certain embodiments of the present invention, the graphical specification, or its stored equivalent, is used to generate a corresponding specification defined in a programming language to form a platform-independent placement specification, which can then be compiled in accordance with a particular computing platform and a particular EDA system. The compilation may be achieved through the component library builder 340. For example, the parameterized cell memory generator 330 may extract the pertinent information from the file generated by the graphical specification editor and convert it into relative object design (ROD) SKILL code, which may then be compiled by the component library builder 340. It should be noted that any programming language may be used to specify the relative placement of one constituent component in the memory storage block to another constituent component. Whereas, ROD-based SKILL code is especially suited for generating circuits, however, other languages, such as "C", may also be used.

Figure 7:
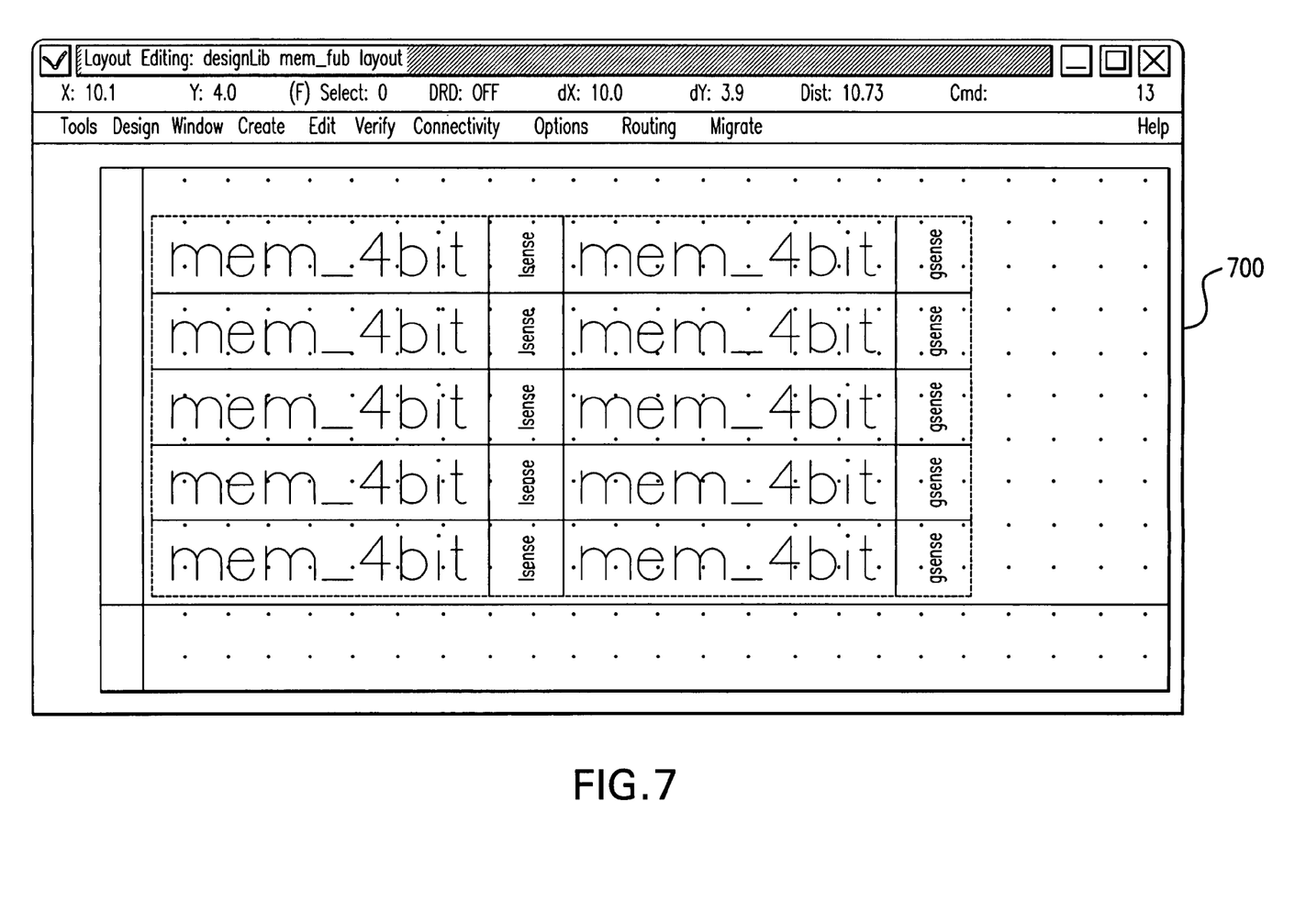
FIG. 7 is a diagram illustrating a memory block cell generated in accordance with the memory storage system specifications of FIG. 6 as retrieved into an exemplary engineering design automation layout editing system.

Once the component cell has been built by the component library builder 340, it may be then stored in a component library 350 in a manner suitable to the applicable EDA system 360. The EDA system 360 may then use the cell as it would any other component cell in a particular design. FIG. 7 depicts the memory storage block described in conjunction with FIGS. 4-6 as retrieved by an exemplary EDA layout editor 700. The component may be placed and routed by the EDA system with other components within the particular circuit design.

The graphical editor 310 may include means for retrieving data through the EDA system 360. For example, a parameterized cell stored in the component library 350 may be called into a graphical specification by an appropriately formatted instantiation thereof. In certain embodiments of the invention, the graphical editor 310 may be packaged into the EDA system 360 itself and the component library builder 340 may be adapted specifically to the EDA system 360. In such embodiments, the memory generator 330 may be omitted and the component library builder 340 may operate directly on EDA-specific specification files.

Figure 8:
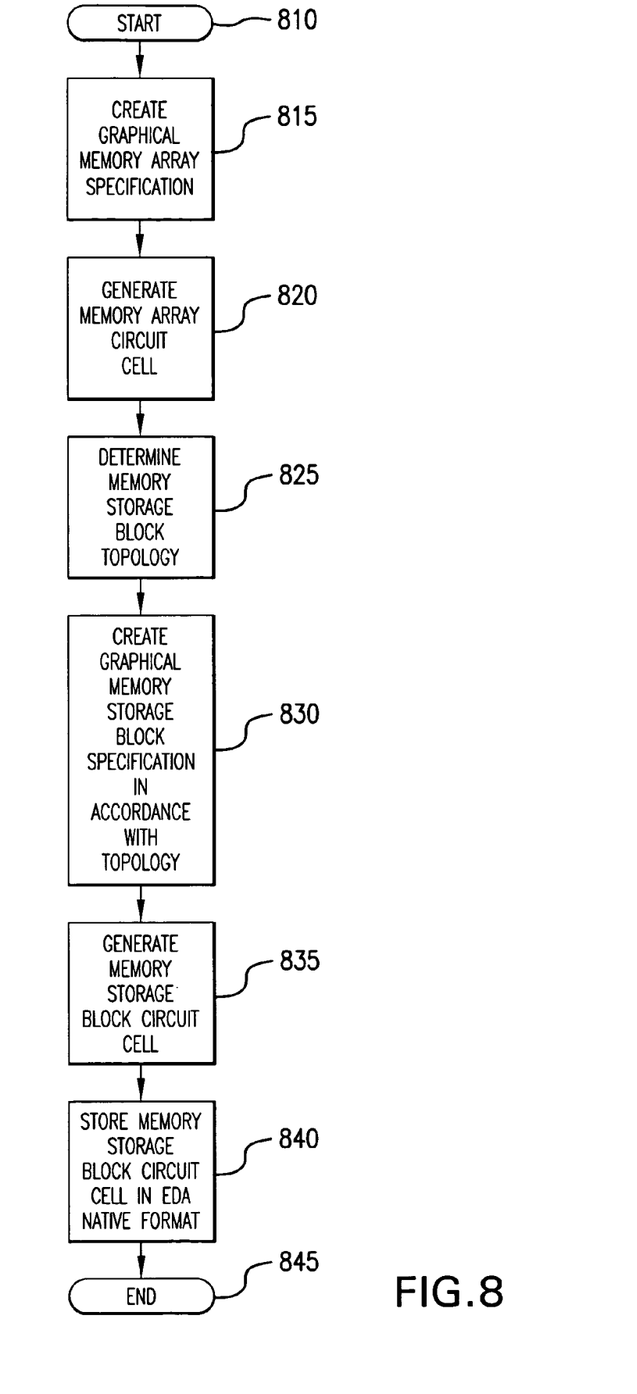
FIG. 8 is a flow diagram of an exemplary process for carrying out embodiments of the invention.

Referring now to FIG. 8, there is shown general procedural steps for generating a memory block cell in accordance with the present invention. The process is entered at block 810, and the process flow proceeds to block 815, where a graphical memory array block specification is created. The specification is created, for example, using the graphical specification editor 310 to define the placement of the constituent components of the memory array cell. Such a memory array cell is shown at 520 and 540 of FIG. 5. Flow is then transferred to block 820, where a memory array circuit cell is generated. The circuit cell generated may be a parameterized cell, as described above. Although the memory array cell generation step 820 is shown after its specification is created, the cell may actually be generated later with other parameterized cells in the specification. The a specification of the memory array circuit cell may be used in the graphical specification for purposes of generating a complete memory storage block specification and then the actual generation of the circuit cells may be generated all at once.

The circuit designer may determine the particular memory storage block topology for the circuit application, as shown at block 825. Flow is then transferred to block 830 where the user may then create a graphical memory storage block specification to meet that specific topology, as indicated at block 830. For example, FIGS. 5-6 illustrate the memory row generation and the memory block generation, respectively, to form the exemplary memory topology. At block 835, a circuit cell is generated for the entire memory storage block. The memory storage block circuit cell may then be stored in a component library in accordance with the EDA native format, as shown at block 840. The memory generation process then terminates at block 845.

The descriptions above are intended to illustrate possible implementations of the present invention and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the pending claims, along with their full range of equivalence.

What is claimed is:

1. A computer platform-based method for generating a circuit cell containing repeating constituent circuit cells, comprising:

specifying through manipulation of indicia in a graphical user interface, a placement of a circuit cell in a physical circuit medium; said graphical user interface used with a display and responsive to a processor; said indicia corresponding to graphic representation of said circuit cell in said graphical user interface;

specifying through manipulation of indicia in said graphical user interface a repetitive placement operation for placing additional circuit cells relative to said placement of said circuit cell to form a graphical circuit cell array specification;

generating and displaying on a display a circuit array cell from said graphical circuit cell array specification;

said circuit cell, said additional circuit cells and said circuit array cell comprising a hierarchical repetitive circuit structure;

instantiating a parameterized circuit cell specification of said circuit cell;

specifying parameters of said parameterized circuit cell specification via said graphical user interface; and specifying said relative placement of said circuit cell through manipulation of a graphical representation of said circuit cell as instantiated from said parameterized circuit cell specification;

wherein each said parameterized circuit cell specification is separately reconfigurable for each instantiation, one from another;

wherein said specifying a placement, and repetitive placement are independent of an external engineering design automation system.

2. The method for generating a circuit cell as recited in claim 1 further including:

specifying through manipulation of indicia in said graphical user interface a repetitive placement operation for placing in said physical circuit medium said circuit array cell relative to a placement of another said circuit array cell to form a graphical block circuit cell specification; and generating a block circuit cell from said graphical block circuit cell specification.

3. The method for generating a circuit cell as recited in claim 1 further including:

specifying through manipulation of indicia in said graphical user interface a placement in said physical circuit medium of said circuit array cell relative to a placement of a auxiliary memory circuit cell to form a graphical memory circuit cell specification; and generating a memory circuit cell from said graphical memory circuit cell specification.

4. The method for generating a circuit cell as recited in claim 3 further including:

instantiating at least one parameterized auxiliary memory circuit cell specification of said auxiliary memory circuit cell;

specifying parameters of said parameterized auxiliary memory circuit via said graphical user interface; and specifying said relative placement of said auxiliary memory circuit cell through manipulation of a graphical representation of said auxiliary memory circuit cell as instantiated from said parameterized auxiliary memory circuit cell specification.

5. The method for generating a circuit cell as recited in claim 3 further including:

specifying through manipulation of indicia in said graphical user interface a repetitive placement operation for placing in said physical circuit medium of said memory circuit cell relative to a placement of other memory circuit cells to form a graphical memory block circuit cell specification; and generating a memory block circuit cell from said graphical memory block circuit cell specification.

6. The method for generating a circuit cell as recited in claim 1 further including extracting said relative placements of said circuit cell from said graphical circuit cell array specification and generating therewith a computing platform-independent relative placement specification.

7. The method for generating a circuit cell as recited in claim 6 further including generating said computing platform-independent specification using a computer programming language.

8. The method for generating a circuit cell as recited in claim 1 further including storing said circuit array cell in a component library in a format consistent with said external engineering design automation system.

9. A computer-platform based method for generating a circuit cell containing repeating constituent circuit cells comprising:

specifying through manipulation of indicia in a graphical user interface, a placement of a circuit cell in a physical circuit medium; said graphical user interface used with a display and responsive to a processor; said indicia corresponding to graphic representation of said circuit cell in said graphical user interface;

specifying through manipulation of indicia in said graphical user interface a repetitive placement operation for placing in said physical circuit medium circuit cells relative to said placement of said circuit cell to form a graphical circuit cell array specification;

specifying through manipulation of indicia in said graphical user interface a repetitive placement operation for placing in said physical circuit medium a block circuit cell relative to a placement of another block circuit cell to form a graphical aggregate circuit cell specification, said block circuit cell including a circuit array cell generated from said circuit cell array specification;

generating and displaying on a display an aggregate circuit cell from said graphical aggregate circuit cell specification;

said circuit cell, said circuit cells, said block circuit cell, and said aggregate circuit cell comprising a hierarchical repetitive circuit structure;

instantiating a parameterized circuit cell specification of said circuit cell;

specifying parameters of said parameterized circuit cell specification via said graphical user interface; and specifying said relative placement of said circuit cell through manipulation of a graphical representation of said circuit cell as instantiated from said parameterized circuit cell specification;

wherein each said parameterized circuit cell specification is separately reconfigurable for each instantiation, one from another;

wherein said specifying a placement, repetitive placement of circuit cells, and repetitive placement of a block circuit cell, are independent of an external engineering design automation system.

10. The method for generating a circuit cell as recited in claim 9 further including:

specifying through manipulation of indicia in said graphical user interface a placement in said physical circuit medium of an auxiliary memory circuit cell relative to a placement of said aggregate circuit cell to form a graphical memory storage block specification; and generating a memory storage block circuit cell from said graphical memory storage block specification.

11. The method for generating a circuit cell as recited in claim 10 further including:

specifying through manipulation of indicia in said graphical user interface a repetitive placement operation for placing in said physical circuit medium said memory storage block circuit cell relative to a placement of another said memory storage block circuit cell to form a graphical aggregate memory storage block specification; and generating an aggregate memory storage block circuit cell from said graphical aggregate memory storage block specification.

12. The method for generating a circuit cell as recited in claim 9 further including:

instantiating a parameterized circuit array cell specification of said circuit array cell;

specifying parameters of said parameterized circuit array cell specification via said graphical user interface; and specifying said relative placement of said circuit array cell through manipulation of a graphical representation of said circuit array cell as instantiated from said parameterized circuit array cell specification.

13. The method for generating a circuit cell as recited in claim 9 further including:

retrieving a previously stored graphical aggregate circuit cell specification from a component library;

modifying a topology of said aggregate circuit cell by manipulating indicia corresponding to said graphical aggregate circuit cell on said graphical user interface; and generating an aggregate circuit cell from said modified graphical aggregate circuit cell specification.

14. A repetitive cell circuit generator comprising:

a graphical specification entry interface executing on a data processing system and receiving from a user through manipulation of graphical indicia thereon repeated relative placement specifications of individual instances of a hierarchical parameterized circuit component cell of a circuit to form a graphical parameterized circuit cell specification; wherein said individual instances are separately reconfigurable one from the other;

a circuit cell generator generating a circuit cell in accordance with said graphical parameterized circuit cell specification; said circuit cell generator operable independent of an external engineering design automation system.

15. The repetitive cell circuit generator recited in claim 14, wherein said circuit cell generator generates layout parameters via a programming language, said layout parameters defining said relative placement of said component cells in accordance with said graphical circuit cell specification.

16. The repetitive cell circuit generator as recited in claim 15 further including a component library builder for generating said circuit cell in accordance with said layout parameters.

17. The repetitive cell circuit generator as recited in claim 16, wherein said circuit cell is stored in a component cell library consistent with a format of said external engineering design automation system.

18. The repetitive cell circuit generator as recited in claim 14, wherein said individual component cells are parameterized circuit cells.

* * * * *